John T. Herndon, Cultivator.

No. 73805

PATENTED JAN 28 1868

Witnesses
W. C. Ashkettle
Thos. Finche

Inventor
Jno T Herndon
per Munn & Co
Attorneys

United States Patent Office.

JOHN T. HERNDON, OF BANCROFT, MISSOURI.

Letters Patent No. 73,805, dated January 28, 1868.

IMPROVEMENT IN CULTIVATORS.

*The Schedule referred to in these Letters Patent and making part of the same.*

TO ALL WHOM IT MAY CONCERN:

Be it known that I, JOHN T. HERNDON, of Bancroft, in the county of Daviess, and State of Missouri, have invented a new and improved Cultivator; and I do hereby declare that the following is a full, clear, and exact description thereof, which will enable those skilled in the art to make and use the same, reference being had to the accompanying drawings, forming part of this specification.

This invention relates to a new and improved cultivator, of that class which are provided with laterally-moving shovels, arranged so that they may be moved by the feet of the driver; and also provided with shovels at the outer sides of the laterally-moving ones, which, in connection with the latter, may be raised and lowered, but have no other movement.

The invention consists in a novel arrangement and construction of the parts, whereby a very simple and durable machine, of the kind specified, is obtained, and one which may be operated with the greatest facility. In the accompanying sheet of drawings—

Figure 1:
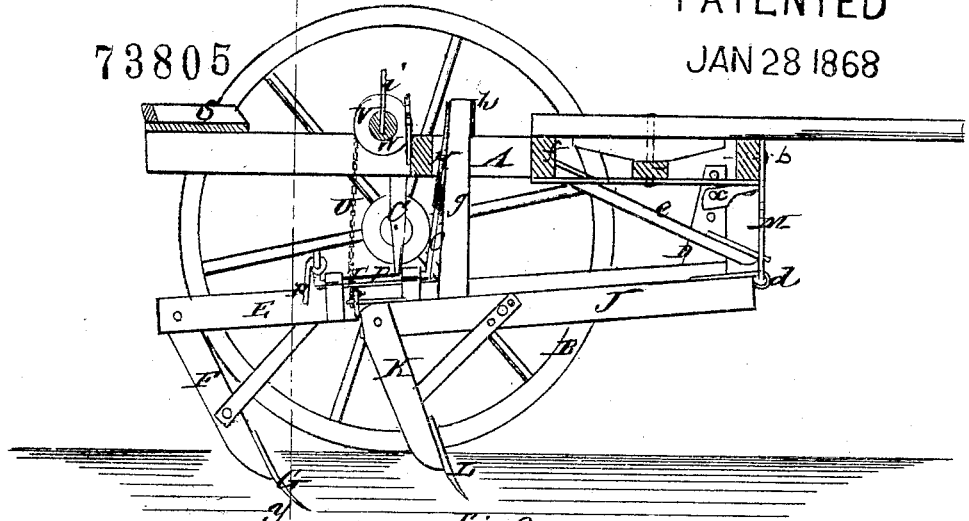
Figure 2:
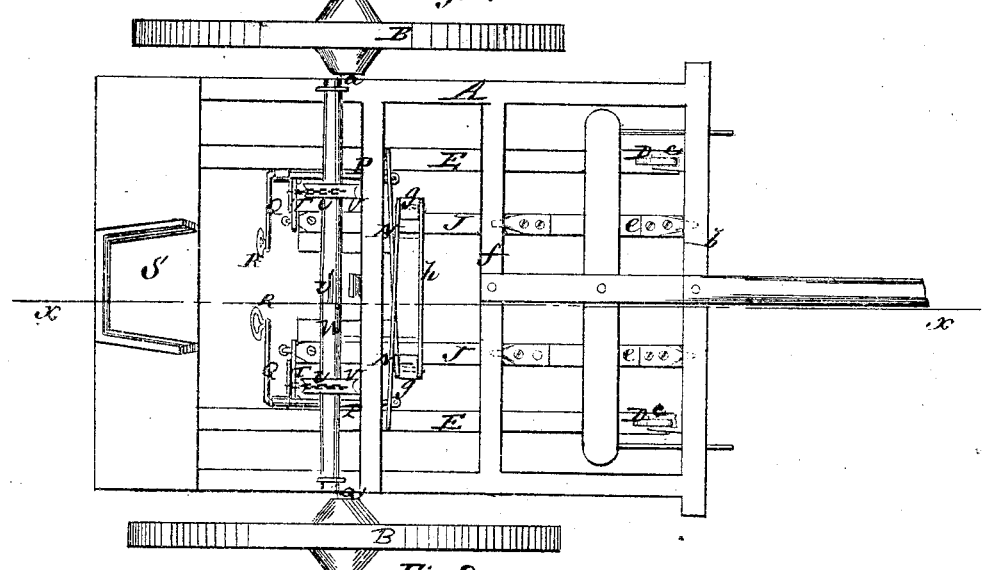

Figure 1 is a side sectional view of my invention, taken in the line $x\ x$, fig. 2.

Figure 2, a plan or top view of the same.

Figure 3:
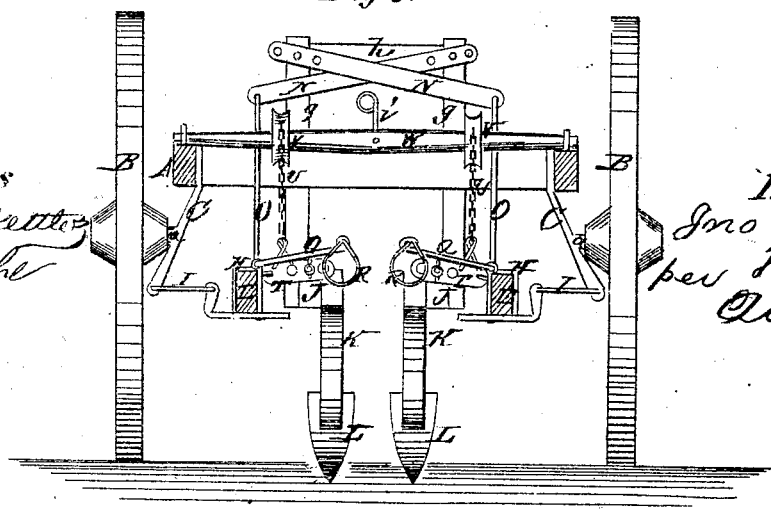

Figure 3, a transverse vertical section of the same, taken in the line $y\ y$, fig. 1.

Similar letters of reference indicate corresponding parts.

A represents a rectangular frame, which is mounted on two wheels B B, the latter being fitted loosely on arms $a\ a$, which project from bars C C, having an inclined position, and attached, at their upper ends, to the sides of the frame A. These bars C C give an elevated position to the frame A, admitting of the latter being above the hubs of the wheels, as shown in figs. 1 and 3. To the front cross-bar, $b$, of the frame A, there are attached, by joints, $c$, two pendent bars, D D, to the lower ends of which plough-beams E are attached, one to each, and to the rear ends of these beams there are secured standards, F, having shares, G, at their lower ends, of the usual cultivator or shovel-shape. On each beam E there is secured a clip, H, and these clips are connected by links, I, to the lower ends of the bars C C. By this arrangement the beams E E are braced laterally, and at the same time allowed a rising and falling adjusting-movement. J J are plough-beams, provided with standards, K, at their rear ends, to which shovels or shares, L, are attached. The front ends of the beams J J are connected by joints, $d\ d$, to the lower ends of pendants M M, which are attached to the front cross-bar $b$, and these pendants are braced by bars $e\ e$, from a cross-piece, $f$, of frame A. Each plough-beam J has an upright, $g$, attached to it, the upper ends of which are connected by a bar, $h$, the ends of the latter being pivoted to the uprights. Each upright, at its upper end, has a bar, N, pivoted to it, and these bars N cross each other, and are connected to the upper ends of arms O, which project upward from the front ends of shafts P, the latter having their bearings on the beams E E, and allowed to turn freely therein. The rear ends of the shafts P P have arms, Q, projecting from them, the arms Q being at right angles with the arms O, and at the outer end of each arm Q there is a stirrup, R, and these stirrups receive the feet of the driver on seat S. The plough-beams E J, at each side of the machine, are connected by a link, T, and these links are connected by chains, U, with pulleys, V, on a shaft, W, which has its bearings on the frame A. The shaft W has an arm, $i$, projecting from it, by which the shaft W may be turned, and all the plough-beams raised or lowered, and the shovels or shares made to penetrate the earth at a greater or less depth, as desired, or retained entirely out of the ground, when turning at the ends of rows, or moving the machine from place to place. The shovels or shares L, of the inner beams J, as the machine is drawn along, work, one at each side of a row of plants, and said shovels or shares are moved laterally, in order to conform to the sinuosities of the row, by actuating the arms Q, which the driver accomplishes by means of his feet.

The device is extremely simple and efficient, may be constructed at a small cost, and there are no parts to get out of repair, or become deranged by use.

I claim as new, and desire to secure by Letters Patent—

1. The combination and arrangement of the beams E J, connected by chains U to pulleys V, on the shaft W, substantially as and for the purpose set forth.

2. The connecting of the inner beams J J by the bar $h$, and the attaching of the uprights $g\ g$ on said beams, to the arms Q, by the bars N, arms O, and shafts P, for the purpose of giving a lateral movement to the shares or shovels L, substantially as and for the purpose specified.

JOHN T. HERNDON.

Witnesses:
JAMES F. HENDRICKS,
NATHAN NICHOLS.